(12) United States Patent
Pathak et al.

(10) Patent No.: US 10,568,073 B2
(45) Date of Patent: Feb. 18, 2020

(54) METHODS AND DUAL SIM DUAL STANDBY (DSDS) DEVICES FOR MANAGING DATA COMMUNICATION

(71) Applicant: Samsung Electronics Co., Ltd., Suwon-si, Gyeonggi-do (KR)

(72) Inventors: Lalit Kumar Pathak, Bangalore (IN); Diwakar Sharma, Bangalore (IN); Mangesh Abhimanyu Ingale, Bangalore (IN); Shrinath Ramamoorthy Madhurantakam, Bangalore (IN); Tushar Vrind, Bangalore (IN); Vinay Kumar Shrivastava, Bangalore (IN); Rohit Kumar, Bangalore (IN); Swapnil Vinod Khachane, Bangalore (IN); Tariq Siddiqui, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 165 days.

(21) Appl. No.: 15/612,238

(22) Filed: Jun. 2, 2017

(65) Prior Publication Data
US 2018/0160422 A1 Jun. 7, 2018

(30) Foreign Application Priority Data
Dec. 7, 2016 (IN) .............................. 201641020834

(51) Int. Cl.
*H04W 72/04* (2009.01)
*H04W 76/10* (2018.01)
(Continued)

(52) U.S. Cl.
CPC ....... *H04W 72/0413* (2013.01); *H04W 76/10* (2018.02); *H04W 76/27* (2018.02); *H04W 88/06* (2013.01)

(58) Field of Classification Search
CPC .. H04W 72/0413; H04W 76/10; H04W 76/27
See application file for complete search history.

(56) References Cited

U.S. PATENT DOCUMENTS 8,914,035 B2 12/2014 Roullier
2002/0080739 A1* 6/2002 Kuwahara ............. H04B 1/715
370/333
(Continued)

OTHER PUBLICATIONS

Samsung, "RRC vs. MAC Signaling," 3GPP TSG-RAN WG2#58-bis, Orlando, Florida, Jun. 25-29, 2007.
(Continued)

*Primary Examiner* — Rhonda L Murphy
(74) *Attorney, Agent, or Firm* — Harness, Dickey & Pierce, P.L.C.

(57) ABSTRACT

Example embodiments herein provide methods and Dual SIM Dual Standby (DSDS) devices including a first Subscriber Identity Module (SIM) and a second SIM for managing data communication. The methods include establishing, by the DSDS device, a Radio Resource Control (RRC) connection over the first SIM and performing data communication with a network entity. Further, the methods include detecting, by the DSDS device, an activity upcoming over the second SIM. Further, the methods include transmitting, by the DSDS device, a connection suspend indication to the network entity to suspend the data communication over the first SIM, wherein the connection suspend indication is transmitted on one of a Layer-1 control signaling channel, a Layer-2 control signaling channel, and a Layer-3 control signaling channel.

20 Claims, 9 Drawing Sheets

(51) Int. Cl.
*H04W 76/27* (2018.01)
*H04W 88/06* (2009.01)

(56) References Cited

U.S. PATENT DOCUMENTS

| | | |
|---|---|---|
| 2014/0220981 A1 | 8/2014 | Jheng et al. |
| 2015/0327324 A1 | 11/2015 | Wei et al. |
| 2018/0184284 A1* | 6/2018 | Cave .................... H04W 72/02 |

OTHER PUBLICATIONS

Ericsson, "Report of the email discussion [93#41][NB-IOT] Resume operation," 3GPP TSG-RAN WG2 Meeting #93bis, Dubrovnik, Croatia, Apr. 11-15, 2016.

Nair, "Global Dual-SIM Smartphone Sales Will Grow to 514 Million Units in 2016," Strategy Analytics Press Releases, Jul. 16, 2015.

3GPP, 3rd Generation Partnership Project; Techincal Specificaiton Group Radio Access Network; Evolved Universal Terrestrial Radio Access (E-UTRA) Radio Link Control (RLC) protocol speciftication.

3GPP LTE, "LTE; Evolved Universal Terrestrial Radio Access (E-UTRA) and Evolved Universal Terrestrial Radio Access Network (E-UTRAN); Overall description; Stage 2," 3GPP TS 36.300 version 10.10.0 Release 10, Jul. 2013, 136 300 V10.10.0.

* cited by examiner

_US 10,568,073 B2_

METHODS AND DUAL SIM DUAL STANDBY (DSDS) DEVICES FOR MANAGING DATA COMMUNICATION

PRIORITY

This application claims priority under 35 U.S.C. § 119(a) to an Indian Provisional Patent Application filed on Jun. 17, 2016 in the Indian Intellectual Property Office and assigned Serial No. 201641020834, and an Indian Complete Patent Application filed on Dec. 7, 2016 in the Indian Intellectual Property Office and assigned Serial No. 201641020834, the entire contents of each of which are incorporated herein by reference.

TECHNICAL FIELD

The example embodiments herein generally relate to mobile communication networks. More particularly, the example embodiments relate to methods and Dual Subscriber Identity Module (SIM) Dual Standby (DSDS) devices including a first SIM and a second SIM for managing data communication.

BACKGROUND

Generally, Dual or Multi SIM (e.g., a first SIM and a second SIM) phones are desirable by users in growing economies as it allows the user to maintain several contexts and manage business with greater ease. Further, usage of Dual-SIM phones is expected to grow at a compound annual growth rate (CAGR) of +17% and Dual-SIM phones may play a key role during migration from Third Generation (3G) towards Fourth Generation (4G) Long Term Evolution (LTE). Further, DSDS devices currently dominate the dual-SIM market with over a 90% share in 2014; the remaining 10% is attributed to Dual-SIM Dual Active (DSDA) devices.

While handling a priority operation on the second SIM of a DSDS device, operation of a Radio Frequency (RF) resource is paused in the first SIM of the DSDS device to grant the RF resource to the second SIM. This mechanism of tuning the RF resource from the first SIM to the second SIM is called RF tune away. An RF resume mechanism is employed to resume operation again on the first SIM and the intervening period of inactivity in the first SIM is called 'RF blackout'. The DSDS device may tune away the RF resource to attend to a high priority signaling procedure on the second SIM. For example, in a DSDS design, a Packet Switched (PS) data operation on the first SIM is considered a low priority whereas, signaling, paging, system information reading, and measurements on the second SIM are considered high priority operations. While handling a higher priority operation on the second SIM, operation of the RF resource is paused in the first SIM to grant the RF resource to the second SIM. Further, there are several other events which may come up based on different protocol and system improvement related scenarios under which operation of the RF resource may be paused in the first SIM to grant the RF resource to the second SIM.

In some systems and methods, during the RF blackout, the DSDS device does not respond to a scheduler in an eNodeB (eNB). However, the eNB may apply adaptation on a link which may cause mistrust in communication between a network entity and the DSDS device. As a protection, the scheduler applies more correction on a DSDS device's feedback, which impacts the resource allocation for the DSDS device. This scenario may cause resource wastage at the network entity and at the same time impact throughput at the DSDS device. Further, this scenario may lead to Radio Link Failure (RLF) and Radio Resource Control (RRC) re-establishment (RRE), causing a delay in resource allocation for the DSDS device.

The DSDS device encounters a delay in resource allocation post RF blackout, a degradation of throughput, an increase in power consumption, loss of service, paging misses, and scalability for N (number) SIM Standby. The network entity encounters resource wastage leading to degradation in system capacity, additional resource usage and contention handling post RF blackout, malfunctioning control mechanisms (such as link adaptation, power control, etc.), and throughput degradation. An operator encounters inferior and frequent RLF/RRE causing Key Performance Indicator (KPI) (such as call success rate and throughput) degradation, and loss of revenue. In some systems and methods, attempts are made to use an RRC signaling connection release indication specifically, the indication corresponds with a "PS resource suspension", which suspends the allocation of resources. However, these systems and methods may suffer from delay caused by Radio Link Control (RLC).

SUMMARY

Example embodiments relate to methods and DSDS devices including a first SIM and a second SIM for managing data communications.

Example embodiments relate to methods and DSDS devices for detecting an activity upcoming over the second SIM.

Example embodiments relate to methods and DSDS device for transmitting a connection suspend indication to a network entity to suspend the data communication over the first SIM, where the connection suspend indication is transmitted on one of a Layer-1 control signaling channel, a Layer-2 control signaling channel, and a Layer-3 control signaling channel.

Example embodiments relate to methods and DSDS devices for receiving a connection suspend acknowledgement indication from the network entity.

Example embodiments relate to methods and DSDS devices for tuning a RF from the first SIM to the second SIM.

Example embodiments relate to methods and DSDS devices for detecting that an activity is completed over the second SIM.

Example embodiments relate to methods and DSDS devices for transmitting a connection resume indication to the network entity to resume the data communication over the first SIM.

Example embodiments herein provide methods for managing data communication at a DSDS device including a first SIM and a second SIM. The methods include establishing a Radio Resource Control (RRC) connection over a first SIM and performing data communication with a network entity via the RRC connection. Further, the methods include detecting an activity upcoming over a second SIM. Further, the methods include transmitting a connection suspend indication to the network entity to suspend the data communication over the first SIM, wherein the connection suspend indication is transmitted on one of a Layer-1 control signaling channel, a Layer-2 control signaling channel, and a Layer-3 control signaling channel.

In example embodiments, the methods further include receiving a connection suspend acknowledgement indication from the network entity. Further, the methods include tuning an RF resource from the first SIM to the second SIM.

In example embodiments, the Layer-1 control signaling channel is one of a Physical Uplink Control Channel (PUCCH), and a Physical Uplink Shared Channel (PUSCH) in uplink direction and/or one of a Physical Downlink Control Channel (PDCCH), and a Physical Downlink Shared Channel (PDSCH) in the downlink direction. The downlink channel is used for a connection suspend acknowledgement indication from the network entity.

In example embodiments, the methods further include transmitting the connection suspend indication as piggy back information when the PUSCH grant is available.

In example embodiments, the methods further include transmitting the connection suspend indication on the PUCCH when the PUSCH grant is unavailable.

In example embodiments, the Layer-2 control signaling channel is a Media Access Control (MAC) channel Control Element (CE).

In example embodiments, the Layer-2 control signaling channel is a reserved bit in the MAC header of the MAC PDU.

In example embodiments, the Layer-2 control signaling is a RLC Control PDU which carries a Control PDU Type (CPT) field to indicate a DSDS control signaling packet with or without an associated payload carrying DSDS signaling information.

In example embodiments, the Layer-3 control signaling channel is a RRC channel.

In example embodiments, the connection suspend indication is transmitted on the Layer-1 control signaling channel when at least one of the following conditions is present: an activity on the second SIM is time critical, the activity on the second SIM is periodic, the activity on the second SIM is shorter in duration, and a bit indication to be sent in the connection suspend message with lower latency.

In example embodiments, the connection suspend indication is transmitted on the Layer-2 control signaling channel when at least one of the following conditions is present: an activity on the second SIM is not time critical, the activity on the second SIM is not periodic, the activity on the second SIM is longer in duration, the activity on the second SIM is correlated with a protection level, an impact of communication failure is within a threshold, and an average latency is expected.

In example embodiments, the connection suspend indication is transmitted on the Layer-3 control signaling channel when at least one of the following conditions is present: an activity on the second SIM is one of periodic in nature such as one in which the second SIM is in a static condition and only paging is scheduled (e.g., in this case only one time communication with details of tune away periods and duration is provided, until the second SIM changes its state and the eNode B (e.g., network entity) of the first SIM schedules the resources according to this schedule information) and includes a large size of information elements, the activity on the second SIM includes a large information elements is to be transferred in one of a connection suspend indication and a resume indication, the activity on the second SIM includes no delay constraints, and resume expected with large information elements.

In example embodiments, the connection suspend indication includes a data suspension reason, a data suspension period, and an error probability.

In example embodiments, the methods further include detecting that an activity is completed over the second SIM. Further, the methods include transmitting a connection resume indication to the network entity to resume the data communication over the first SIM.

In example embodiments, the connection resume indication is one of an implicit resume indication and an explicit resume indication.

In example embodiments, one of a Scheduling Request (SR) and a Buffer Status Report (BSR) request is considered as an implicit resume indication when no information is to be shared with the network entity.

In example embodiments, one of a SR and a BSR request is considered as an explicit resume indication with RRC signaling when information is to be shared with the network entity.

In example embodiments, one of a SR and a BSR is transmitted before or along with sending the connection suspend indication to the network entity to suspend the data communication over the first SIM.

In example embodiments, establishing the RRC connection over the first SIM and performing the data communication with the network entity includes sending a DSDS device capability indication to the network entity, receiving a common resource channel allocated by the network entity, and establishing the RRC connection over the first SIM and performing the data communication with the network entity.

In example embodiments, the methods further include detecting that an activity is completed over the second SIM. Further, the methods include transmitting one of the data and the BSR indication to the network entity over a common resource channel.

In example embodiments, the common resource channel is a contention-based Physical Uplink Shared Channel (CB-PUSCH).

In example embodiments, an Uplink (UL) BSR is calculated and transmitted before tuning the RF resource from the first SIM to the second SIM.

In example embodiments, a Timing Advance (TA) command is received from the network entity after tuning the RF resource from the second SIM to the first SIM.

Example embodiments herein provide DSDS devices having a first SIM, a second SIM, and a controller. The controller is configured to establish a RRC connection over the first SIM and performing data communication with a network entity via the RRC connection. Further, the controller is configured to detect an activity upcoming over the second SIM. Further, the controller is configured to transmit a connection suspend indication to the network entity to suspend the data communication over the first SIM, where the connection suspend indication is transmitted on one of a Layer-1 control signaling channel, a Layer-2 control signaling channel, and a Layer-3 control signaling channel.

Example embodiments herein provide network entity devices having a processor and a memory communicably connected to the processor. The memory stores one or more software modules including a scheduler. The scheduler, when executed by the processor, is configured to receive a connection suspend indication from a Dual SIM Dual Standby (DSDS) device, wherein the connection suspend indication is received on one of a Layer-1 control signaling channel, a Layer-2 control signaling channel, and a Layer-3 control signaling channel. The scheduler is further configured to suspend at least one of scheduling physical resources and enabling Carrier Aggregation (CA) for the DSDS device, in response to receiving the connection suspend indication. Furthermore, the scheduler is configured to send a connection suspend acknowledgement indication to the DSDS device.

Example embodiments herein provide devices having a first SIM, a second SIM, and a controller. The controller is configured to establish a RRC connection over the first SIM to perform data communication with a network entity. Further, the controller is configured to detect an upcoming activity at the second SIM. Further, the controller is configured to determine a value of one or more channel selection parameters. Further, the controller is configured to select a signaling channel from among a Layer-1 control signaling channel, a Layer-2 signaling channel, and a Layer 3 control signaling channel, based on the determined value of the one or more channel selection parameters. Further, the controller is configured to transmit, in response to detecting the upcoming activity, a connection suspend indication to the network entity over the selected signaling channel. Furthermore, the controller is configured to tune an RF resource from the first SIM to the second SIM after detecting the upcoming activity.

BRIEF DESCRIPTION OF THE FIGURES

Example embodiments are illustrated in the accompanying drawings, throughout which like reference numbers indicate corresponding parts in the various figures. The example embodiments herein will be better understood from the following description with reference to the drawings, in which.

DETAILED DESCRIPTION

Figure 1A:
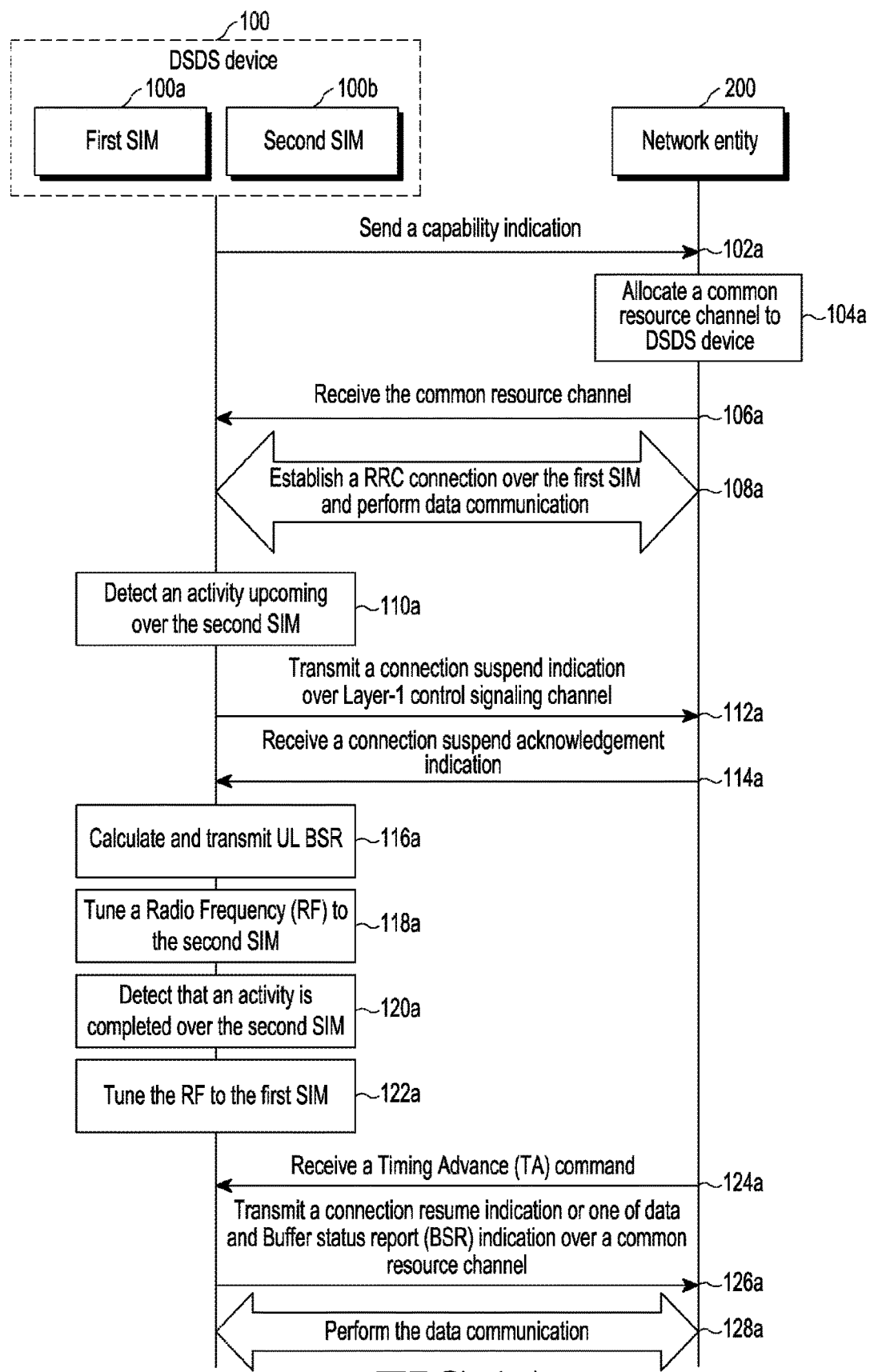
FIG. 1a is a sequence diagram for managing data communication in which a DSDS device transmits a connection suspend indication to a network entity on a Layer-1 control signaling channel, according to example embodiments as disclosed herein.

Various example embodiments of the present disclosure will now be described in detail with reference to the accompanying drawings. In the following description, specific details such as detailed configuration and components are merely provided to assist the overall understanding of these example embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one or more other example embodiments to form new example embodiments.

Herein, the term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure. Likewise, the blocks of the example embodiments may be physically combined into more complex blocks without departing from the scope of the disclosure.

The example embodiments herein provide methods for managing data communication at a Dual Subscriber Identity Module (SIM) Dual Standby (DSDS) device including a first SIM and a second SIM. The methods include establishing a Radio Resource Control (RRC) connection over the first SIM and performing data communication with a network entity. Further, the methods include detecting an activity upcoming over the second SIM. Further, the methods include transmitting a connection suspend indication to the network entity to suspend the data communication over the first SIM, wherein the connection suspend indication is transmitted on one of a Layer-1 control signaling channel, a Layer-2 control signaling channel, and a Layer-3 control signaling channel.

While handling a priority operation on the second SIM, operation of a Radio Frequency (RF) resource is paused in the first SIM to grant the RF resource to the second SIM, this is also called RF tune away. An RF resume mechanism is employed to resume operation again and the period of inactivity in the first SIM is called 'RF blackout'.

An active DSDS device may tune away to attend to high priority signaling procedures on another network. In a DSDS design, Packet Switched (PS) data operation on one SIM is considered a low priority whereas, signaling, paging, system information reading and measurements on the other SIM are considered high priority operations. While handling a higher priority operation on the second SIM, operation of the RF resource is paused in the first SIM to grant the RF resource to the second SIM. The RF resume mechanism is employed to resume operation again. There are several other events which may come up based on different protocol and system improvement related scenarios under which the operation of the RF resource may be paused in the first SIM to grant the RF to a stack corresponding to the second SIM.

When a tune away event occurs, the DSDS device may adopt one of the following schemes or an alteration/combination of them to send a suspend message providing an indication of the event to a network entity:
 a. Explicit signaling via a new Media Access Control (MAC) Control Element (CE) or a new Radio Link Control (RLC) Control Protocol Data Unit (PDU)
 b. Explicit signaling via a new RRC Message (Signaling message)
 c. Explicit signaling via a new Layer-1 Message (Control channel message)

For each of the above signaling schemes, the indication may be based on the knowledge of an expected blackout period as per the activities planned on the other SIM, or based on explicit suspend and resume information. The network entity may send a confirmation in response to the suspend message, and implementation margin may dictate whether confirmation is mandatory or not (e.g., if the DSDS device can wait for 500 ms before tuning-away, a confirmation is solicited).

Also the methods include an approach to determine the suspend message transmission status with Hybrid Automatic Repeat Request (HARD) or Ack/Nack and then relay this status information to the MAC, the RLC, or the RRC layer based on which module initiates the suspend message. In this approach, no explicit confirmation is required and latency is reduced. A Hybrid signaling scheme may be adopted differently for specific scenarios, for example, a suspend message sent in response to a tune away event to receive paging may be performed via a Layer-1 control signaling message indication (on a Physical Uplink Control Channel (PUCCH) or a Physical Uplink Shared Channel (PUSCH)). Alternatively, a suspend message sent in response to a tune away event for signaling (e.g., Location Area Update/Routing Area Update (LAU/RAU)) may be performed via a MAC message. In example embodiments, a suspend message sent in response to a tune away event for System Information (SI) acquisition may be performed via a MAC or a RRC message.

MAC/Layer-1 signaling offers several benefits compared to RRC message exchange. RRC level signaling is protected by RLC Acknowledgement Mode (AM) which causes retransmission in poor radio conditions and hence may not be a good approach for time critical jobs (e.g., paging) on the other SIM. As discussed further in "RRC Vs. MAC signaling", Samsung 3GPP Tdoc R2-072611, Jun. 25-29, 2007, Evolved Universal Mobile Telecommunications System Terrestrial Radio Access (E-UTRA) supports control signaling in terms of MAC control signaling (Layer-1/Layer-2 control channel and MAC control PDU and RRC control signaling (RRC message)). The signaling reliability is high for RRC ($\sim 10^{-6}$) and for MAC it is relatively low ($\sim 10^{-3}$). At the same time, control delay in the MAC signaling is shorter compared to the RRC signaling. Processing delay and additional delay due to the RLC (e.g. the retransmission delay at the RLC and delay to avoid out of sequence delivery, etc.) are important factors to be considered for a DSDS scenario. The "time to affect", e.g., how quickly it is desired that the changes be affected, is a factor that should also be considered. If it is important to affect the change in the next few Time Transmission Intervals (TTIs) then it is prudent to use MAC signaling. MAC signaling is preferable over RRC in such a scenario because it incurs less overhead. RRC signaling also has additional Packet Data Convergence Protocol (PDCP) and RLC headers. It should also be possible to configure the MAC header for control signaling purpose.

After sending the suspend message (e.g., connection suspend indication), the DSDS device may perform the following operations:
 a. Tune the RF resource for use by the other SIM
 b. Perform implicit Discontinuous Transmission/Discontinuous Reception (DTX/DRX) during the RF blackout
 c. Freeze all active timers, or reset the relevant timers (Layer-2 level timers may be reset, Layer-3 level timers may be stopped, some timers like Out of Service/Radio Link Failure (RLF) may be stopped, or a combination of timer control may be adopted for each scenario independently)
 d. Freeze measurement and averaging of measurement reports
 e. Flush HARQ buffers
 f. Start DSDS-DRX timer (tracks the progress of the RF blackout, the DSDS device is expected to resume before the DSDS-DRX timer expires)
 g. If resumption does not occur before the DSDS-DRX timer expires, then delete the RRC context at the DSDS device (for example if the other SIM started attending a call, it may be engaged for several minutes). It is also possible that if the DSDS device detects that there is mobility occurring on the other SIM (e.g., cell change/handover), then in some cases, the DSDS device may delete the RRC context for the first SIM.

After receiving the suspend message, the network entity may perform the following operations:
 a. Keep an RRC_CONNECTED state for the DSDS device context
 b. Suspend an RRC inactivity timer
 c. Suspend a scheduler for the DSDS device (flush HARQ)
 d. Activate a DSDS-DRX for the DSDS device (longer than Connected Mode DRX (C-DRX) which may be maximum time tune away, may happen for signaling case (say 30 seconds—Location Area (LA) timeout))

e. Ignore Channel Quality Indicator/Precoding Matrix Indicator (CQI/PMI) and other feedback and reports after receiving the suspend message
f. Suspend RRM and mobility for the DSDS device
g. If there is any paging for the DSDS device, buffer it in the network entity, until DSDS-DRX expires. The paging may be shared with the DSDS device if it resumes before a paging timer expires as a connected mode paging message. If DSDS-DRX continues after the paging timer expires; on expiry of the paging timer, a no-response message from the DSDS device should be shared with the core network (please note that as the DSDS device state is in an RRC_Connected state, not all cells in the Location/Routing/Tracking Area (LA/RA/TA) will be paging the DSDS device).
h. If DSDS-DRX expires and the DSDS device did not resume, delete the RRC Context for the DSDS device.

After the end of RF blackout period, the DSDS device may send a resume message; after sending the resume message, the DSDS device may perform the following operations:
  a. Unfreeze all timers/procedures
  b. Obtain DL Synchronization with the serving cell
  c. If the DSDS device finds the same cell (where it suspended)
    i. Perform a Scheduling Request/Random Access Attempt (SR/RACH) to send a Buffer Status Report (BSR)
    ii. Send resume message (including a source cell ID—where it suspended)
    iii. If the DSDS device receives a resume confirm message, then continue normal procedure, otherwise go to RRC_Idle mode, and perform Radio Resource Control (RRC) re-establishment (RRE)
  d. If the DSDS device finds a different cell
    i. Perform a RACH to send a BSR (DSDS device ID may be an International Mobile Subscriber Identity (IMSI))
    ii. Send resume message (including a Source Cell ID—where it suspended)
    iii. If the DSDS device receives a resume confirm message, then continue normal procedure, otherwise go to RRC_Idle mode, and perform RRE.
  e. The DSDS device may fall back to 3GPP procedure for inter Radio Access Technology (RAT) cell selection, if the previous RAT is not found. Please note that the DSDS device may be moved to a new cell in a different TA/Public Land Mobile Network (PLMN) as well.

After receiving the resume message, network entity may perform the following operations:
  a. Receive the resume message (including the Source Cell ID—where the DSDS device suspended)
    i. If (Source Cell ID==Current Cell ID), then unfreeze DSDS device Access Stratum (AS) procedures and unfreeze or restart relevant timers. Activate the scheduler for the DSDS device and send a resume confirmation message
    ii. If (Source Cell ID is not the Current Cell ID), then pull the context from the Source Cell (enable X2 interface if desired), if it succeeds, then send a resume confirmation message, otherwise send a resume failure message
  b. Continue normal procedures for the DSDS device The first scheme, sending the DSDS MAC CE, is based on the knowledge of the expected RF blackout period as per the activities planned on other SIM. The DSDS device sends information like the blackout activation time and blackout period. The RF blackout period is shared in multiples of $DSDS_{TTI}$. $DSDS_{TTI}$ is calculated as $M*TTI_{duration}$, where M signifies the minimum RF blackout required to complete a procedure on the other SIM. In example embodiments M is set to '5' and $TTI_{duration}$ is set to 1 millisecond. If the activation time for the RF blackout is the $N_{th}$ TTI, the DSDS device sends the BSR or SR for the DSDS MAC CE, at $BeginCE_{TTI}$ which is calculated as below:

$$BeginCE_{TTI} = N - (Max_{RV} * HARQ_{reTx}) + Grant_{TTI} \qquad (1)$$

Where $Grant_{TTI}$ is the minimum time required by the network entity to allocate the RF resources. $Max_{RV}$ is the maximum number of redundancy versions and $HARQ_{reTx}$ is the retransmission time for a HARQ per process.

The DSDS MAC CE waits for a HARQ ACK/NACK for an $RFPause_{TTI}$ duration which is calculated as below:

$$RFPause_{TTI} = N - (Max_{RV} * HARQ_{reTx}) \qquad (2)$$

The DSDS device tunes away the RF resource as soon as it gets the HARQ ACK for the DSDS MAC CE. If the ACK is not received, the tune away still occurs, even though this may cause network resource wastage. This first scheme suffers in performance when the RF blackout period is over-estimated or under-estimated. To overcome this issue, a second scheme is proposed which sends explicit suspend and resume information in the DSDS MAC CE without any additional information, however $BeginCE_{TTI}$ and $RFPause_{TTI}$ remain the same.

In example embodiments, the first SIM and the second SIM are assumed to be connected to the same or different network entities. Operation on the first SIM does not enforce specific operation on the second SIM. However, possible operation on either SIM, during idle and connected mode are classified as below in Table-1:

TABLE 1

| First SIM | Second SIM |
| --- | --- |
| Data (with or w/o Connected DRX) | Cell Selection |
| Data (with or w/o Connected DRX) | Cell Reselection leading to Location Area Update (LAU/RAU) |
| Data (with or w/o Connected DRX) | System Information (SI) Reading, discrete or normal |
| Data (with or w/o Connected DRX) | Paging followed by measurement in mobility |
| Data (with or w/o Connected DRX) | Mobile Originated (MO) call/Short Message Service (SMS) |
| Data (with or w/o Connected DRX) | Paging followed by Mobile Terminated (MT) call/SMS |
| Data (with or w/o Connected DRX) | Non-Access Stratum (NAS) triggered Periodic RAU/LAU |

An arbitrator is deployed between the first SIM and the second SIM, which grants the RF resources and schedules the stack based on the scheduling decision.

Various options (Layer-1/Layer-2/Layer-3 based signaling) are evaluated for communication between the DSDS device and the network entity for suspend and resume operation. Further, hybrid signaling methods are proposed for efficient usage of the network entity resources and the DSDS device throughput.

Referring now to the drawings, and more particularly to FIGS. 1a through 8, where similar reference numbers denote corresponding features consistently throughout the figures, are shown example embodiments.

FIG. 1a is a sequence diagram for managing data communication in which a DSDS device 100 transmits a connection suspend indication to a network entity 200 on a Layer-1 control signaling channel, according to example embodiments as disclosed herein. In example embodiments, a wireless communication system includes DSDS device 100 and network entity 200. The wireless communication system may be, for example, a Long Term Evolution (LTE), a Universal Mobile Telecommunications System (UMTS), a Global System for Mobile communication (GSM), or the like. DSDS device 100 includes a first SIM 100*a* and a second SIM 100*b*. Here, for convenience, only two SIMs are shown. However, it should be noted that any number of SIMs may be used for describing the proposed methods without departing from the scope of the invention. Also, for convenience, it is shown that first SIM 100*a* and second SIM 100*b* access the same network entity 200 as shown in the FIG. 1*a*. However, it should be noted that first SIM 100*a* and second SIM 100*b* may access different network entities (e.g., first SIM 100*a* may access a first network entity and second SIM 100*b* may access a second network entity).

DSDS device 100 may be, but is not limited to, a mobile phone, a smart phone, a Personal Digital Assistant (PDA), a tablet, a phablet, a consumer electronic device, or any other electronic device with dual SIM capability. Network entity 200 may be, but is not limited to, a Mobility Management Entity (MME) or an eNodeB (eNB). The sequence of communications between DSDS device 100 and network entity 200 is described below:

At operation 102*a*, initially, DSDS device 100 sends a capability indication (e.g., DSDS capability indication) to network entity 200. In an example, DSDS device 100 capability indication 'DSDS-Cap' is added in the DSDS device 100 capability indication to inform about the same (e.g., if the 'DSDS-Cap' indication is 'True', the device is a DSDS device, if the 'DSDS-Cap' indication is 'False', the device is normal or Dual-SIM Dual Active (DSDA) capable).

DSDS capability is indicated by DSDS device 100 and a contention-based Physical Uplink Shared Channel (CB-PUSCH) resource is configured for DSDS device 100 usage only according to the following guidelines.
1. MAC/RRC signaling is used to exchange signaling and configurations between DSDS device 100 and network entity 200.
2. CB-PUSCH resources are reserved by network entity 200 specifically for DSDS user equipment 100 usage only to reduce latency
3. Configured CB-PUSCH resources are to be utilized once, and only post RF pause.

At operation 104*a*, after receiving the capability indication, network entity 200 may be configured to allocate a common resource channel to DSDS device 100. In example embodiments, the common resource channel is the CB-PUSCH.

At operation 106*a*, DSDS device 100 may be configured to receive the common resource channel from network entity 200. In example embodiments, the information about the common resource channel is stored in DSDS device 100 for later usage.

At operation 108*a*, DSDS device 100*a* establishes a RRC connection over first SIM 100*a* and performs data communication with network entity 200.

At operation 110*a*, DSDS device 100 may be configured to detect an activity upcoming over second SIM 100*b*. In example embodiments, the upcoming activity may be reception of a system information block (SIB), paging message, measurement operation or high priority signaling (e.g., location area update), or the like.

At operation 112*a*, after detecting the activity upcoming over second SIM 100*b*, DSDS device 100 may be configured to transmit a connection suspend indication to network entity 200 to suspend the data communication over first SIM 100*a*. Here, the connection suspend indication is transmitted over the Layer-1 (L1) control signaling channel. In example embodiments, the Layer-1 control signaling channel is one of a PUCCH and a PUSCH. In example embodiments, DSDS device 100 transmits the connection suspend indication as piggy back information when the PUSCH grant is available. In example embodiments, DSDS device 100 transmits the connection suspend indication on the PUCCH when the PUSCH grant is unavailable.

In example embodiments, the connection suspend indication is transmitted on the Layer-1 control signaling channel when one of the following conditions is present: an activity on second SIM 100*b* is time critical, the activity on second SIM 100*b* is periodic, the activity on second SIM 100*b* is shorter in duration, and a bit indication is to be sent in the connection suspend indication with lower latency. In example embodiments, the connection suspend indication includes a data suspension reason, a data suspension period, and an error probability.

At operation 114*a*, DSDS device 100 may be configured to receive a connection suspend acknowledgment indication from network entity 200.

At operation 116*a*, after receiving the connection suspend acknowledgment indication, DSDS device 100 may be configured to calculate and transmit an uplink (UL) BSR before tuning the RF resource from first SIM 100*a* to second SIM 100*b*.

Before entering the RF Pause, anticipating and calculating expected UL buffer size at end of the RF blackout is performed and transmitted to network entity in the following operations:
1. Triggering of the BSR
2. Communicating the DSDS device 100 UL buffer size to network entity 200 prior to entering the RF Pause.

At operation 118*a*, DSDS device 100 tunes the RF resource from first SIM 100*a* to second SIM 100*b*. In example embodiments, an arbitrator (not shown) in DSDS device 100 may be used to tune the RF resource from first SIM 100*a* to second SIM 100*b*. In example embodiments, the arbitrator may include a software agent executed on a processor in DSDS device 100, although the scope of claimed subject matter is not limited in this respect. In example embodiments, the arbitrator may be implemented in hardware, or in a combination of hardware and software. The functionalities of the arbitrator are explained further in conjunction with FIG. 4.

At operation 120*a*, DSDS device 100 may be configured to detect that the activity is completed over the second SIM 100*b*.

At operation 122*a*, DSDS device 100 tunes the RF resource to first SIM 100*a* from second SIM 100*b*.

At operation 124*a*, DSDS device 100 may be configured to receive a Timing Advance (TA) command from network entity 200 after tuning the RF resource from second SIM 100*b* to first SIM 100*a*.

DSDS device 100 assists network entity 200 to perform transmission of the TA MAC CE immediately after the first UL transmissions by DSDS device 100 after the RF Pause.

At operation 126*a*, in example embodiments, DSDS device 100 may be configured to transmit a connection resume indication to network entity 200 to resume data communication over first SIM 100*a*. In example embodiments, the connection resume indication is one of an implicit resume indication and an explicit resume indication. In an example, a SR or a BSR request is considered an implicit resume indication when no information is to be shared with network entity 200. In example embodiments, a SR or a BSR request is considered an explicit resume indication with RRC signaling when information is to be shared with network entity 200.

In example embodiments, DSDS device 100 may be configured to transmit the data or the BSR indication to network entity 200 over the common resource channel allocated by network entity 200.

In example embodiments, based on a BSR sent before the RF pause, network entity 200 schedules the UL grant immediately if there is a deterministic RF pause which provides for subsequent adjustment as follows:
1. DSDS device 100 triggers a new BSR
2. DSDS device 100 transmits UL data on the received grant along with new BSR to adjust the current buffer status.

In example embodiments, after the RF Pause Black-Out, the current DSDS device 100 UL buffer size is communicated to network entity 200 at the first UL occasion using the CB-PUSCH according to the following:
1. Mandatory triggering of the BSR
2. Prioritized transmission of the BSR along with other UL data on the CB-PUSCH resource if occasion of the BSR lies before the SR occasion.
3. DSDS device 100 identification is provided through Demodulation Reference Signals (DMRS) even when collision happens and network entity 200 schedules the UL grants for DSDS device 100.
4. Especially useful for un-deterministic RF pause.

At operation 128*a*, data communication over first SIM 100*a* between DSDS device 100 and network entity 200 is performed.

The various operations in the sequence diagram may be performed in the order presented, in a different order or simultaneously. Further, in some example embodiments, some of the operations may be omitted, added, modified, skipped, or the like without departing from the scope of the invention.

Figure 1B:
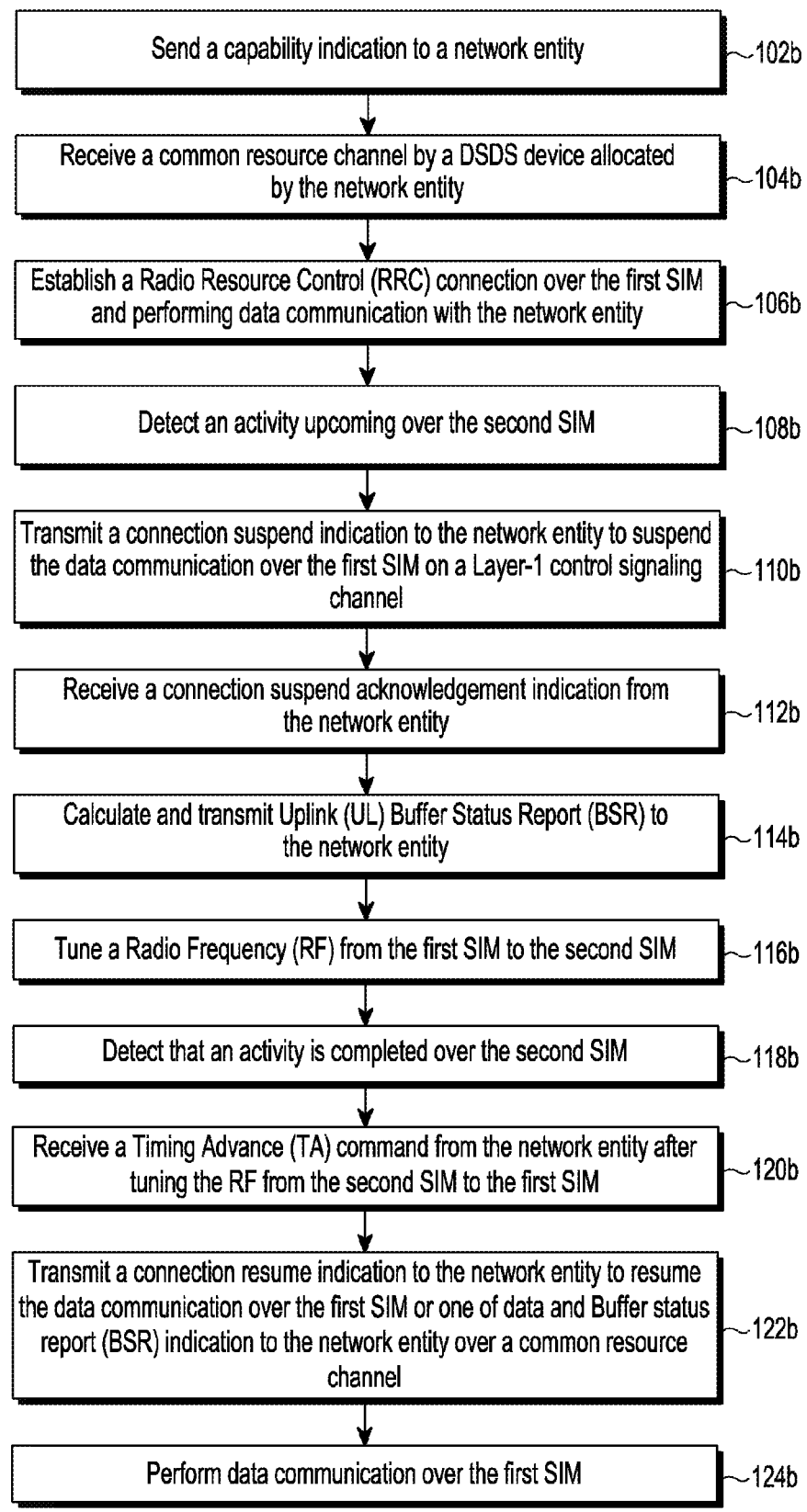
FIG. 1b is a flow chart illustrating a method for managing data communication at a DSDS device including a first SIM and a second SIM in which the DSDS device transmits a connection suspend indication to a network entity on a Layer-1 control signaling channel, according to example embodiments as disclosed herein.

FIG. 1*b* is a flow chart illustrating a method for managing data communication at a DSDS device (e.g., DSDS device 100) including a first SIM (e.g., first SIM 100*a*) and a second SIM (e.g., second SIM 100*b*) in which the DSDS device transmits the connection suspend indication to a network entity (e.g., network entity 200) on a Layer-1 control signaling channel, according to example embodiments as disclosed herein.

At operation 102*b*, the method includes sending a capability indication to a network entity. At operation 104*b*, the method includes receiving a common resource channel allocated by the network entity. At operation 106*b*, the method includes establishing a RRC connection over a first SIM and performing data communication with the network entity. At operation 108*b*, the method includes detecting an activity upcoming over a second SIM.

At operation 110*b*, the method includes transmitting a connection suspend indication to the network entity to suspend the data communication over the first SIM on a Layer-1 control signaling channel. At operation 112*b*, the method includes receiving a connection suspend acknowledgement indication from the network entity. At operation 114*b*, the method includes calculating and transmitting a UL BSR to the network entity. At operation 116*b*, the method includes tuning a RF resource from the first SIM to the second SIM. At operation 118*b*, the method includes detecting that the activity is completed over the second SIM.

At operation 120*b*, the method includes receiving a TA command from the network entity after tuning the RF resource from the second SIM to the first SIM. At operation 122*b*, the method includes transmitting a connection resume indication to the network entity to resume the data communication over the first SIM or one of the data and the BSR indication to the network entity over a common resource channel. At operation 124*b*, the method includes performing the data communication over the first SIM.

In example embodiments, consider a scenario where the activities on the second SIM are time critical, periodic, and shorter in duration such as a discrete System Information Block (SIB) reading on the second SIM where scheduling of SIB segments is over small intervals and involves multiple RF tune aways in 1-2 DRX periods. In this scenario, the connection suspend indication is communicated on the PUCCH to the network entity and designed to operate with 1% error probability. In example embodiments, the connection suspend indication is piggybacked on the PUSCH if the grant is available, which permits operation with 10% error probability and provides the flexibility of retransmission by virtue of a HARQ.

In example embodiments, the DSDS device may be configured to send (or transmit) a suspend request (e.g., connection suspend indication) to the network entity as the piggy back information, if the PUSCH grant is already is available. If an activation time for blackout is the Nth TTI, TriggerSuspendTTI, the time at which the suspend request is sent, is calculated as shown in equation-3 below:

$$\text{TriggerSuspendTTI} = N - (\text{MaxRV} * \text{HARQreTx}) \tag{3}$$

In example embodiments, the DSDS device may be configured to send the suspend request on the PUCCH, when the PUSCH grant is not available, and the TriggerSuspendTTI may be calculated as shown in equation-4 below:

$$\text{TriggerSuspendTTI} = N - \text{eNbdecode} \tag{4}$$

Where eNbdecode is the duration of time required for the network entity to decode the suspend request. Further, BlackoutPeriodTTI, the duration of the blackout period, is calculated as shown in equation-5 below:

$$\text{BlackoutPeriodTTI} = N - (\text{MaxRV} * \text{HARQreTx} - \text{eNbdecode}) \tag{5}$$

Further, the SR or the BSR request is treated as an implicit resume, if no information is to be shared with the network entity (e.g., eNodeb), and a resume with RRC signaling if any information is to be shared with the network entity.

The various actions, acts, blocks, operations, or the like in the flow chart may be performed in the order presented, in a different order or simultaneously. Further, in some example embodiments, some of the actions, acts, blocks, operations, or the like may be omitted, added, modified, skipped, or the like without departing from the scope of the invention.

Figure 2A:
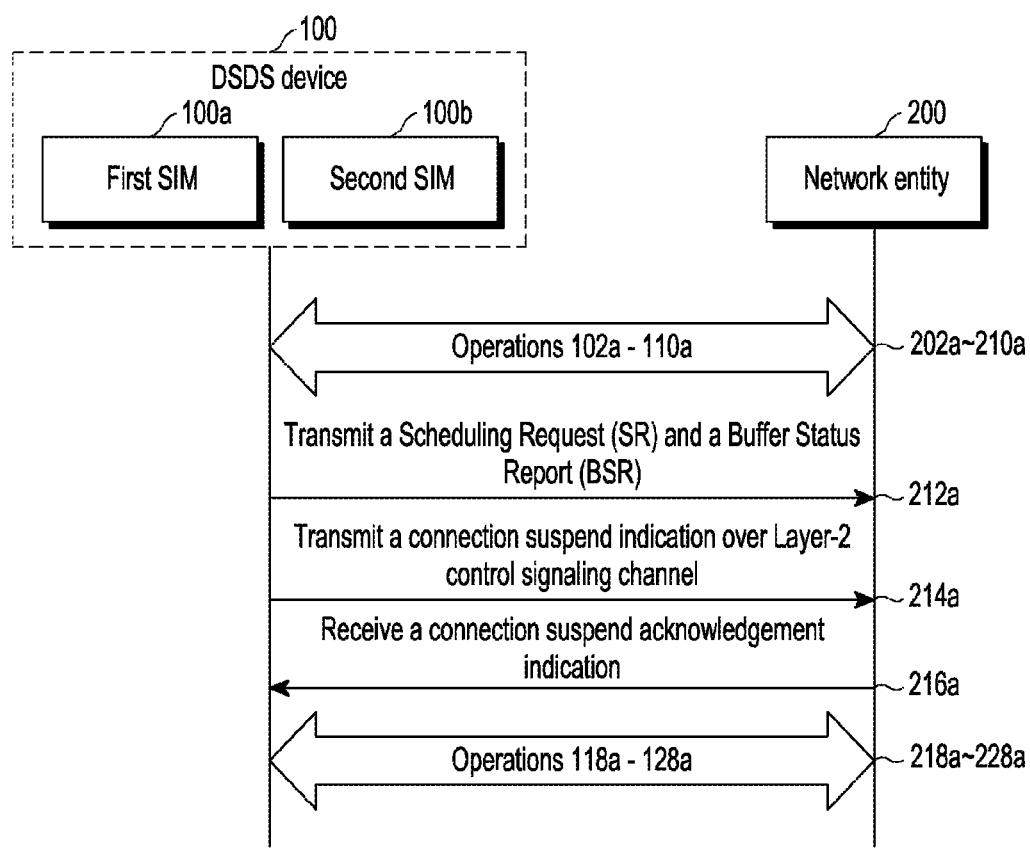
FIG. 2a is a sequence diagram for managing data communication in which a DSDS device transmits a connection suspend indication to a network entity on a Layer-2 control signaling channel, according to example embodiments as disclosed herein.

FIG. 2*a* is a sequence diagram for managing data communication in which a DSDS device 100 transmits a connection suspend indication to a network entity 200 on a Layer-2 control signaling channel, according to example embodiments as disclosed herein. DSDS device 100 includes a first SIM 100*a* and a second SIM 100*b*. The sequence of communications between DSDS device 100 and network entity 200 are described below:

Operations 202*a*-210*a* contain a similar sequence of communications to operations 102*a*-110*a* as explained in conjunction with FIG. 1*a*.

At operation 212a, DSDS device 100 may be configured to transmit a SR and a BSR to network entity 200.

At operation 214a, DSDS device 100 may be configured to transmit a connection suspend indication over a Layer-2 control signaling channel. In example embodiments, the Layer-2 control signaling channel is a MAC channel CE. In example embodiments, the connection suspend indication is transmitted on the Layer-2 control signaling channel when at least one the following conditions is present: an activity on a second SIM 100b is not time critical, the activity on second SIM 100b is not periodic, the activity on second SIM 100b is longer in duration, the activity on second SIM 100b is correlated with a protection level, an impact of communication failure is within a threshold, and an average latency is expected. In example embodiments, the connection suspend indication includes a data suspension reason, a data suspension period, and an error probability.

At operation 216a, DSDS device 100 may be configured to receive a connection suspend acknowledgement indication from network entity 200. In example embodiments, a connection resume indication is one of an implicit resume indication and an explicit resume indication. The SR and BSR requests are considered to be an implicit resume indication when no information is to be shared with network entity 200. The SR and BSR requests are considered to be an explicit resume indication with RRC signaling when the information is to be shared with network entity 200.

Operations 218a-228a contain a similar sequence of communications to operations 118a-128a as explained in conjunction with FIG. 1a.

The various operations in the sequence diagram may be performed in the order presented, in a different order or simultaneously. Further, in some example embodiments, some of the operations may be omitted, added, modified, skipped, or the like without departing from the scope of the invention.

Figure 2B:
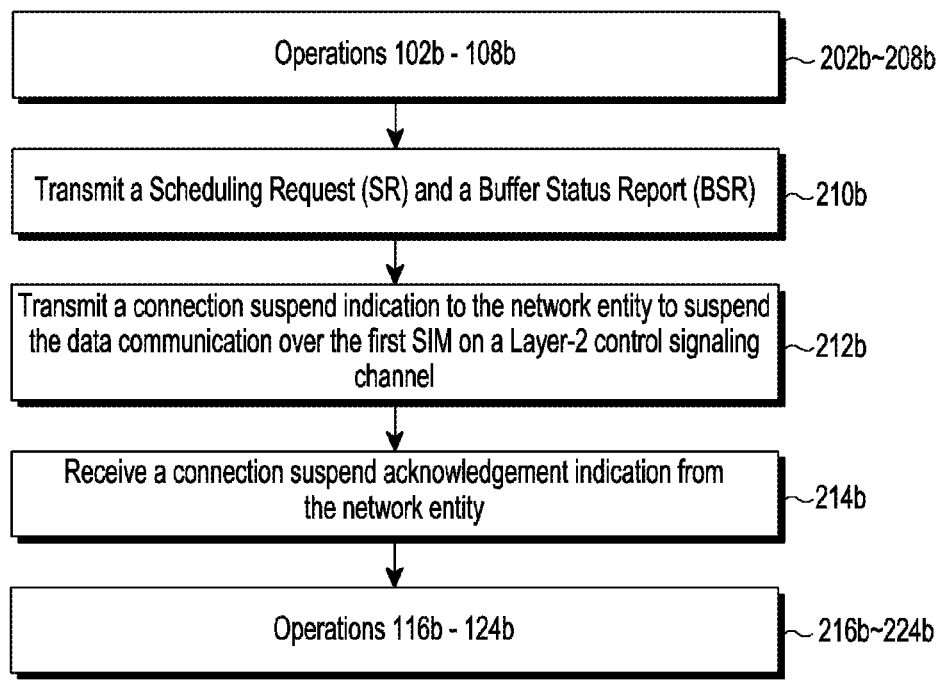
FIG. 2b is a flow chart illustrating a method for managing data communication at a DSDS device including a first SIM and a second SIM in which the DSDS device transmits a connection suspend indication to a network entity on a Layer-2 control signaling channel, according to example embodiments as disclosed herein.

FIG. 2b is a flow chart illustrating a method for managing data communication at a DSDS device (e.g., DSDS device 100) including a first SIM (e.g., first SIM 100a) and a second SIM (e.g., second SIM 100b) in which the DSDS device transmits a connection suspend indication to a network entity (e.g., network entity 200) on a Layer-2 control signaling channel, according to example embodiments as disclosed herein. As shown in FIG. 2b, operations 202b-208b contain processes similar to those in operations 102b-108b as explained in conjunction with FIG. 1b.

At operation 210b, the method includes transmitting a SR and a BSR to a network entity. At operation 212b, the method includes transmitting a connection suspend indication to the network entity to suspend data communication over a first SIM on a Layer-2 control signaling channel. At operation 214b, the method includes receiving a connection suspend acknowledgement indication from the network entity. As shown in the FIG. 2b, operations 216b-224b contain processes similar to those in operations 116a-124a as explained in conjunction with FIG. 1b.

In example embodiments, consider a scenario when the activities on the second SIM are not time critical, periodic, or shorter in duration, but an average level of protection is used. For example, in DSDS scenarios, the second SIM desires the RF resource for cell selection while data communication is ongoing on the first SIM. A fast RF resource switch is expected on the second SIM for the cell selection and measurements. However, failure of communication of the MAC CE suspend message will only defer the cell selection in an error scenario. In this scenario, the first SIM sends the SR/BSR to request for the UL grant to send a suspend request with a MAC CE packet.

The first SIM tunes away the RF resource as soon as it receives the HARQ acknowledgment of the MAC CE with a timing margin of the network entity decoding the MAC CE. After receiving the suspend request on the MAC CE, network entity 200 notifies a scheduler to stop allocating resources for first SIM 100a. First SIM 100a requests SR for the DSDS MAC CE, as shown below in equation-6:

$$\text{TriggerSuspendTTI} = N - (\text{MaxRV} * \text{HARQreTx}) + \text{GrantTTI} \quad (6)$$

The SR/BSR request is treated as an implicit resume, if no information is to be shared with network entity 200 (e.g., eNB) and a resume with RRC signaling if any information is to be shared with network entity 200.

In example embodiments, the DSDS scenarios and durations are shown below in Table-2:

TABLE 2

| Scenario | Duration in ($DSDS_{TTI}$) |
|---|---|
| Decoding Paging Indicator and Paging Block | 8 |
| Inter-Frequency, Inter-RAT measurement | 12 |
| RAU/LAU | 600 |
| SI Reading | 200 |
| Cell Selection/Cell Update | 400 |

The various actions, acts, blocks, operations, or the like in the flow chart may be performed in the order presented, in a different order or simultaneously. Further, in some example embodiments, some of the actions, acts, blocks, operations, or the like may be omitted, added, modified, skipped, or the like without departing from the scope of the invention.

Figure 3A:
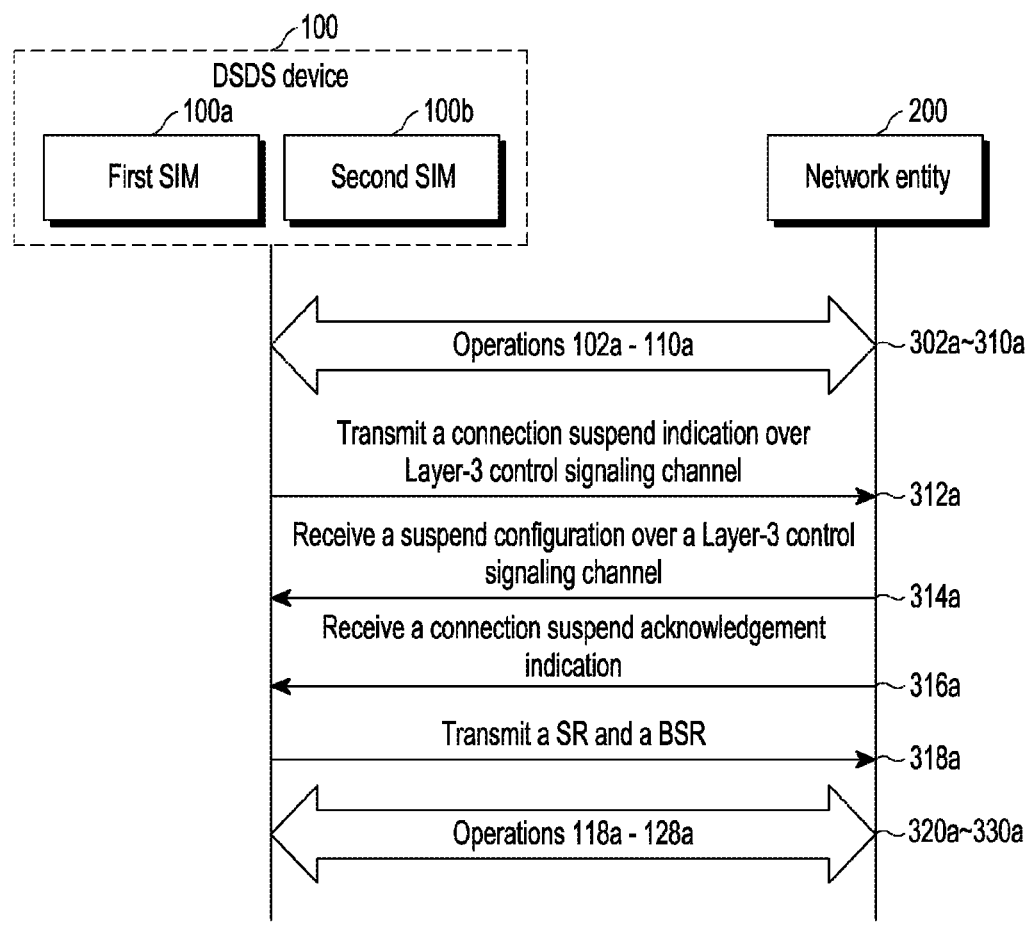
FIG. 3a is a sequence diagram for managing data communication in which a DSDS device transmits a connection suspend indication to a network entity on a Layer-3 control signaling channel, according to example embodiments as disclosed herein.

FIG. 3a is a sequence diagram for managing data communication in which a DSDS device 100 transmits a connection suspend indication to a network entity 200 on a Layer-3 control signaling channel, according to example embodiments as disclosed herein. DSDS device 100 includes a first SIM 100a and a second SIM 100b. The sequence of communications between DSDS device 100 and network entity 200 are described below:

Operations 302a-310a contain a similar sequence of communications to operations 102a-110a as explained in conjunction with FIG. 1a.

At operation 312a, a DSDS device 100 may be configured to transmit a connection suspend indication on a Layer-3 control signaling channel to a network entity 200. In example embodiments, the Layer-3 control signaling channel is a RRC channel. In example embodiments, the connection suspend indication is transmitted on the Layer-3 control signaling channel when at least one of the following conditions is present: an activity on a second SIM 100b is either periodic in nature (e.g., second SIM is in static condition and only paging is scheduled, in this case only one time communication with details of tune away periods and duration is performed until second SIM 100b changes its state and network entity 200 of a first SIM 100a schedules the RF resources according to this schedule information) or includes large information elements, the activity on the second SIM includes transferring large information elements in one of the connection suspend indication and a resume indication, the activity on the second SIM includes no delay constraints, and a resume indication is expected with large information elements. In example embodiments, the connection suspend indication includes a data suspension reason, a data suspension period, and an error probability.

At operation 314a, DSDS device 100 may be configured to receive a suspend configuration over the Layer-3 control signaling channel from network entity 200.

At operation 316a, DSDS device 100 may be configured to receive a connection suspend acknowledgement indication from network entity 200.

At operation 318a, DSDS device 100 may be configured to transmit a SR and a BSR to network entity 200.

Operations 320a-330a contain a similar sequence of communications to operations 118a-128a as explained in conjunction with FIG. 1a.

The various operations in the sequence diagram may be performed in the order presented, in a different order or simultaneously. Further, in some example embodiments, some of the operations may be omitted, added, modified, skipped, or the like without departing from the scope of the invention.

Figure 3B:
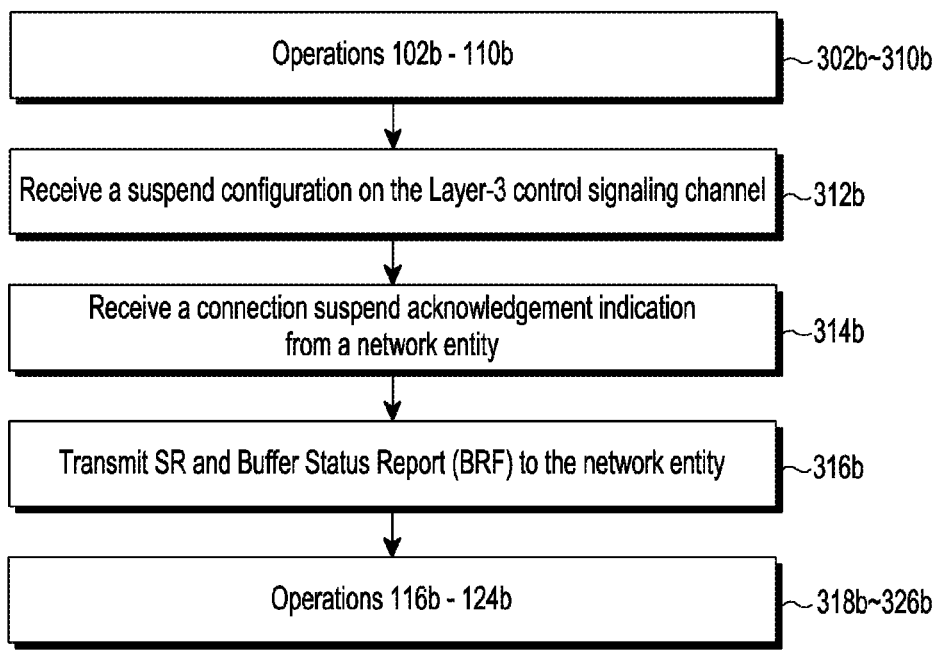
FIG. 3b is a flow chart illustrating a method for managing data communication at a DSDS device including a first SIM and a second SIM in which the DSDS device transmits a connection suspend indication to a network entity on a Layer-3 control signaling channel, according to example embodiments as disclosed herein.

FIG. 3b is a flow chart illustrating a method for managing data communication at a DSDS device (e.g., DSDS device 100) including a first SIM (e.g., first SIM 100a) and a second SIM (e.g., second SIM 100b) in which the DSDS device transmits a connection suspend indication to a network entity (e.g., network entity 200) on a Layer-3 control signaling channel, according to example embodiments as disclosed herein. As shown in the FIG. 2b, operations 302b-310b contain processes similar to those in operations 102b-110b as explained in conjunction with FIG. 1b.

At operation 312b, the method includes receiving a suspend configuration on a Layer-3 control signaling channel. At operation 314b, the method includes receiving a connection suspend acknowledgement indication from a network entity. At operation 316b, the method includes transmitting an SR and a BSR to the network entity. As shown in the FIG. 3b, operations 318b-326b contain processes similar to those in operations 116b-124b as explained in conjunction with FIG. 1b.

In example embodiments, RRC signaling is generally selected when the size of the information elements is large, no strict delay constraints are present, and high reliability is desired. Unlike the Layer-1 control signaling channel, RRC signaling is protected by the HARQ at the MAC layer and also protect by a Radio link Layer (RLC). Paging/Discrete system information reads of the second SIM and sharing scheduling information with the network entity of the first SIM may be performed using RRC signaling.

Once the signaling is completed, the second SIM RF grant allocation and the network entity resource allocation may be implicitly scheduled, without any exchange of information elements. The DSDS device sends the BSR or the SR for the DSDS RRC suspend message, at TriggerSuspend$_{TTI}$ calculated as shown below in equation-7:

$$\text{TriggerSuspend}_m = N - \text{Activation}_{Time} \quad (7)$$

Where the Activation$_{Time}$ is given be equation-8 as shown below:

$$\text{Activation}_{Time} \leq \text{Max\_RLC}_{L2tx} * ((\text{Max}_{RV} * \text{HARQ}_{reTx}) + \text{L2ACK}_{maxRLCRX} / \text{Grant}_{TTI} \quad (8)$$

Where Max_RLC$_{L2tx}$ is the maximum duration of a Layer-2 control signal transmission over the RLC and L2ACK$_{MaxRLCRX}$ is the maximum duration to receive an ACK over a Layer-2 RLC.

The various actions, acts, blocks, operations, or the like in the flow chart may be performed in the order presented, in a different order or simultaneously. Further, in some example embodiments, some of the actions, acts, blocks, operations, or the like may be omitted, added, modified, skipped, or the like without departing from the scope of the invention.

Figure 4:
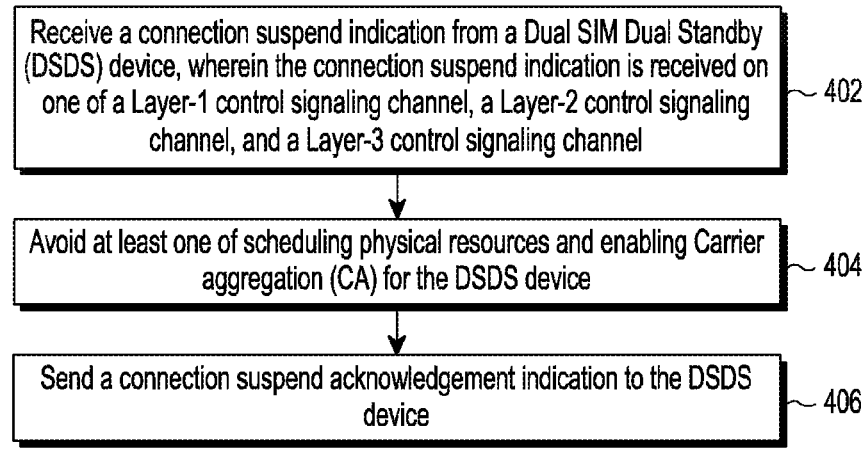
FIG. 4 is a flow chart illustrating various operations performed by a network entity for managing data communication in response to receiving a connection suspend indication from a DSDS device, according to example embodiments as disclosed herein.

FIG. 4 is a flow chart illustrating various operations performed by a network entity (e.g., network entity 200) for managing data communication, according to example embodiments as disclosed herein. At operation 402, the method includes receiving a connection suspend indication from a DSDS device (e.g., DSDS device 100). The method allows a scheduler of the network entity to receive the connection suspend indication from the DSDS device. The connection suspend indication is received on one of a Layer-1 control signaling channel, a Layer-2 control signaling channel, and a Layer-3 control signaling channel.

At operation 404, the method includes avoiding at least one of scheduling physical resources and enabling Carrier Aggregation (CA) for the DSDS device. The method allows the scheduler to avoid at least one of scheduling the physical resources and enabling the CA for the DSDS device. At operation 406, the method includes sending a connection suspend acknowledgement indication to DSDS device 100. The method allows the scheduler to send the connection suspend acknowledgement indication to the DSDS device.

The various actions, acts, blocks, operations, or the like in the flow chart may be performed in the order presented, in a different order or simultaneously. Further, in some example embodiments, some of the actions, acts, blocks, operations, or the like may be omitted, added, modified, skipped, or the like without departing from the scope of the invention.

Figure 5:
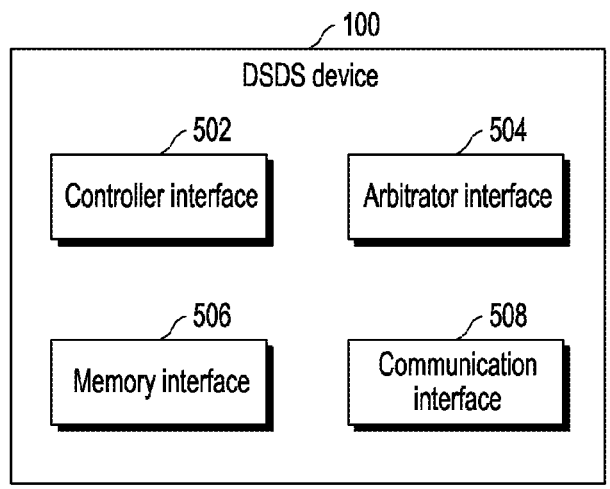
FIG. 5 illustrates various components of a DSDS device, according to example embodiments as disclosed herein.

FIG. 5 illustrates various components of DSDS device 100, according to example embodiments as disclosed herein. In example embodiments, DSDS device 100 includes a controller 502, an arbitrator 504, a memory 506, and a communication interface 508.

Controller 502 may be configured to establish an RRC connection over a first SIM (e.g., first SIM 100a) and perform data communication with a network entity (e.g., network entity 200). Further, controller 502 may be configured to detect activity upcoming over a second SIM (e.g., second SIM 100b). Further, controller 502 may be configured to transmit a connection suspend indication to network entity 200 to suspend the data communication over first SIM 100a, where the connection suspend indication is transmitted on one of a Layer-1 control signaling channel, a Layer-2 control signaling channel, and a Layer-3 control signaling channel. The decision of which signaling channel to utilize for the transmission of the connection suspend indication may be based on a value of one or more channel selection parameters. Further, the functionalities performed by DSDS device 100 as described above in conjunction with the FIGS. 1a-3b may also be performed by controller 502. Arbitrator 504 may be configured to tune the RF resource from first SIM 100a to second SIM 100b. Further, arbitrator 504 may be configured to tune the RF resource from second SIM 100b to first SIM 100a. In example embodiments, arbitrator 504 is a software module executed by controller 502 or by a processor. In example embodiments, arbitrator 504 performs functions through the use of hardware components.

In example embodiments, the one or more channel selection parameters include one or more of the following: time criticality of the upcoming activity, periodicity of the upcoming activity, duration of the upcoming activity, whether a bit indication is to be sent in the connection suspend message with lower latency, whether the upcoming activity is associated with a protection level, whether the impact of communication failure is within a set threshold, whether average latency is expected, whether the second SIM is in a static condition wherein only paging reception is scheduled and includes large information elements, whether the upcoming activity includes transferring large information elements in one of the connection suspend indication and a resume indication, whether the upcoming activity includes delay constraints, and whether a resume indication is expected with large information elements.

Memory 506 may include one or more computer-readable storage media. Memory 506 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, memory 506 may, in some example embodiments, be considered a non-transitory storage medium. The term "non-transitory" may indicate that the storage medium is not embodied in a carrier wave or a propagated signal. However, the term "non-transitory" should not be interpreted to mean that memory 506 is non-movable. In example embodiments, a non-transitory storage medium may store data that may, over time, change (e.g., in Random Access Memory (RAM) or cache). Communication interface 508 communicates internally with the various components and externally with networks.

In example embodiments, if a single communication mechanism (e.g., Layer-1/Layer-2/Layer-3) is applied for all DSDS scenarios, the solution may be less effective with regard to network entity 200 physical resources and RF resource scheduling at DSDS device 100. Thus, Hybrid Signaling is proposed with the below principles:

1. When larger information is to be transferred (e.g., second SIM activities periodic in nature), either in a suspend request or a resume request, RRC signaling is suggested.
2. Layer-1 control signaling is selected when a bit indication is to be sent in the connection suspend indication with lower latency.
3. MAC control elements are suggested when the impact of communication failure is not large, and average latency is expected.
4. RRC signaling is suggested when the resume indication is expected to contain larger information (e.g., global cell ID); otherwise the SR/BSR is treated as an implicit trigger for the resume request.

MAC/Layer-1 offers several benefits compared to RRC message exchange. RRC level signaling is protected by the RLC AM and causes re-transmission in poor radio conditions and hence may not be a good approach for time critical jobs on the other SIM (e.g., paging). As discussed further in "RRC Vs. MAC signaling", Samsung 3GPP Tdoc R2-072611, Jun. 25-29, 2007, Evolved Universal Mobile Telecommunications System Terrestrial Radio Access (E-UTRA) supports control signaling in terms of MAC control signaling (Layer-1/Layer-2 control channel and MAC control PDU and RRC control signaling (RRC message)). The signaling reliability is high for RRC ($\sim 10^{-6}$) and for MAC it is relatively low ($\sim 10^{-3}$). At the same time, control delay in the MAC signaling is shorter compared to the RRC signaling. Processing delay and additional delay due to the RLC (e.g., the retransmission delay at the RLC and delay to avoid out of sequence delivery, etc.) are important factors to be considered for a DSDS scenario. The "time to affect", e.g., how quickly it is desired that the changes be affected, is a factor that should also be considered. If it is important to affect the change in the next few TTIs then it is prudent to use the MAC signaling. The MAC signaling is preferable to RRC because it incurs less overhead. RRC signaling may have additionally PDCP and RLC headers. It should also be possible to configure the MAC header for a control signaling purpose.

FIG. 5 shows limited components of DSDS device 100 but it is to be understood that other example embodiments are not limited thereon. In other example embodiments, DSDS device 100 may include less or more components. Further, the labels or names of the components are used only for illustrative purpose and do not limit the scope of the invention. One or more components may be combined together to perform the same or a substantially similar function in DSDS device 100.

Figure 6:
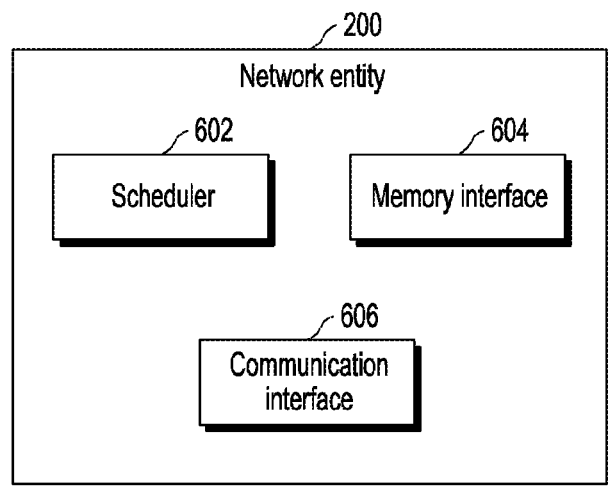
FIG. 6 illustrates various components of a network entity, according to example embodiments as disclosed herein.

FIG. 6 illustrates various components of network entity 200, according to example embodiments as disclosed herein. In example embodiments, network entity 200 includes a scheduler 602, a memory 604, and a communication interface 606.

Scheduler 602 is configured to receive a connection suspend indication from a DSDS device (e.g., DSDS device 100), where the connection suspend indication is received on one of a Layer-1 control signaling channel, a Layer-2 control signaling channel, and a Layer-3 control signaling channel. Further, scheduler 602 is configured to avoid scheduling physical resources and enabling a CA for the DSDS device. Further, scheduler 602 is configured to send a connection suspend acknowledgement indication to the DSDS device. In example embodiments, scheduler 602 may correspond to a programming module stored in memory 604 and executed by a processor. In example embodiments, Scheduler 602 may be implemented in hardware, or in a combination of hardware and software.

Memory 604 may include one or more computer-readable storage media. Memory 604 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, memory 604 may, in some example embodiments, be considered a non-transitory storage medium. The term "non-transitory" may indicate that the storage medium is not embodied in a carrier wave or a propagated signal. However, the term "non-transitory" should not be interpreted to mean that memory 604 is non-movable. In certain example embodiments, a non-transitory storage medium may store data that can, over time, change (e.g., in Random Access Memory (RAM) or cache). Communication interface 606 communicates internally with the various components and externally with networks.

The FIG. 6 shows limited components of network entity 200 but it is to be understood that other example embodiments are not limited thereon. In other example embodiments, network entity 200 may include less or more components. Further, the labels or names of the components are used only for illustrative purposes and do not limit the scope of the invention. One or more components may be combined together to perform the same or a substantially similar function in network entity 200.

Figure 7A:
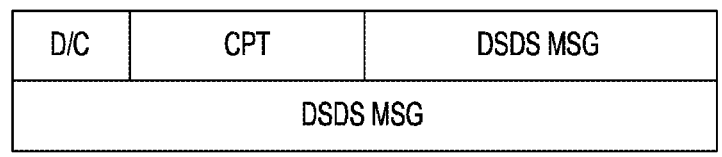
FIG. 7a illustrates a new RLC control Protocol Data Unit (PDU) for carrying a DSDS message as payload, according to example embodiments as disclosed herein.

FIG. 7a illustrates a new RLC control PDU for carrying a DSDS message as payload, according to example embodiments as disclosed herein. The payload may have a defined message structure to convey periodic/deterministic RF gap information e.g. gap start/end time, pattern, etc. The confirmation/feedback may also be defined or local HARQ based confirmation may be used (HARQ-Automatic Repeat Request (ARQ) interaction).

As shown in FIG. 7a, the details of the new RLC control PDU are described below:
1. D/C—0: Control PDU
2. Control PDU Type (CPT)-111 (reserved pattern): New control PDU type for DSDS—normally discarded by protocol for reserved pattern, only 000 is allowed
3. DSDS MSG—Variable size information possible. May include suspend/resume indication bit, gap start time (System Frame Number (SFN), TTI), gap end time (SFN, TTI), possibly BSR information.
4. D/C—0: Control PDU
5. CPT—any other reserved pattern for DSDS feedback from network (if desired).
6. May not include any contents, just padded 0 for nibble.
7. Local HARQ-ACK/NACK: Feedback from the HARQ to the RLC may be locally implemented to ascertain transmission status of this DSDS control PDU. Therefore, DSDS feedback from the network entity and associated delays are avoided. The new RLC control PDU is to be mapped to a signaling radio bearer such as SRB2. Moreover, the control PDU is not subject to a prohibit timer, so no further delay is expected.

Figure 7B:
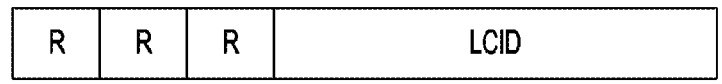
FIG. 7b illustrates a new Media Access Control (MAC) Control Element (CE) to carry a suspend/resume indication and gap information, according to example embodiments as disclosed herein.

FIG. 7b illustrates a new MAC CE to carry a suspend/resume indication and gap information, according to example embodiments as disclosed herein. As shown in the FIG. 7b, the details of the new MAC CE are described below:
1. 01100-10100 are reserved patterns for a Link Control Identifier (LCID)
   a. Without payload:
      i. LCID: 01110 (reserved pattern)—DSDS Suspend message
      ii. LCID: 01111 (reserved pattern)—DSDS Resume message
   b. With fixed size payload
   c. LCID: 01110—DSDS message
   d. DSDS payload carries a suspend/resume indication bit, gap start time (SFN, TTI), gap end time (SFN, TTI), possibly BSR information
   e. Variable size payload possible with a different format
2. Making use of reserved bits in header to signify suspend/resume message
   a. First R and third R bits are available to indicate a suspend indication and a resume indication respectively (second R bit has been defined in latest MAC spec release for bigger PDUs)

Faster Transmission Payload (TP) approach: SR- ->Required Grant (instead of SR- ->BSR- ->Grant):
1. Additionally, it should be possible to include a prior BSR report (or estimated BSR after RF gap) along with the suspend indication described in association with FIGS. 2b and 3b, and after the RF gap DSDS device sends an SR.
2. Network interprets this SR and prior BSR information to directly allocate a required (bigger) grant and thereby, throughput build up time is reduced after every RF gap.

Supported PLMN based/Operation status based/DSDS capability based signaling:
1. PLMN based signaling:
   a. If the RF gap is to be indicated to the network entity, then LTE Access Stratum (AS) has to do it selectively. The gap indication will be supported only in a selected network.
   b. Hence the gap indication should be sent only if the DSDS device is camped in the supported network. For this, LTE AS will use a PLMN indication to make this decision.
2. Operation status based:
   a. Even though the DSDS device is camped to the network entity where the gap indication is supported by the network entity for DSDS, the DSDS device may indicate the gap based on the actual DSDS operation status
   b. That is, if the RF resource is being used by another RAT only then indicate the gap
3. DSDS capability based:
   a. LTE RRC may report in the DSDS capability about the DSDS device (Reserved Feature Group Indicator (FGI) bit) if camped on a supported network entity. This means, the network is aware from the beginning about User Equipment (UE) being DSDS capable Link sustenance related issues:
1. The network entity ensures providing TA command at earliest opportunity and frequently post RF pause. This is only possible after few UL transmissions.
2. Alternately, TA configuration may be switched to some default relaxed mode to avoid timer expiries at both the DSDS device and the network entity sides (e.g., switching TA timer configuration value to infinity).

Paging enhancement related issues:
1. The DSDS device tends to miss paging if there is paging cycle conflict with another SIM or due to another SIM being in some other operation.
2. In idle mode, there is no way to send an indication to the network entity about the gap. However, the DSDS device capability information may be used by the network entity to determine a paging repetition pattern (this pattern may be checked for feasibility and practicality).

Figure 8:
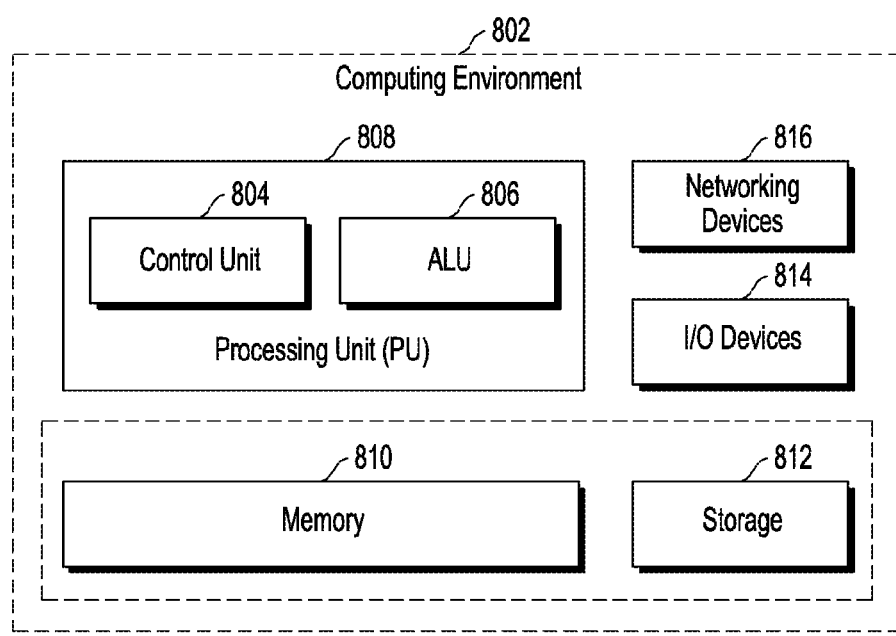
FIG. 8 illustrates a computing environment for implementing methods and DSDS devices including a first SIM and a second SIM for managing data communication, according to example embodiments as disclosed herein.

FIG. 8 illustrates a computing environment for implementing methods and DSDS devices (e.g., DSDS device 100) including a first SIM (e.g., first SIM 100a) and a second SIM (e.g., second SIM 100b) for managing data communication, according to example embodiments as disclosed herein. As depicted in FIG. 8, a computing environment 802 includes at least one processing unit 808 that is equipped with a control unit 804 and an Arithmetic Logic Unit (ALU) 806, a memory 810, a storage unit 812, plurality of networking devices 816 and a plurality of Input/Output (I/O) devices 814. Processing unit 808 is responsible for processing stored instructions. Processing unit 808 receives commands from the control unit in order to perform its processing. Further, any logical and arithmetic operations involved in the execution of the instructions are computed with the help of ALU 806.

Computing environment 802 may be composed of multiple homogeneous and/or heterogeneous cores, multiple CPUs of different kinds, special media and other accelerators. Further, a plurality of processing units 808 may be located on a single chip or over multiple chips.

Instructions and codes used for the implementation of the methods described herein are stored in memory 810, storage 812, or both. At the time of execution, the instructions may be fetched from the corresponding memory 810 or storage 812, and executed by processing unit 808.

In hardware implementations, various networking devices 816 or I/O devices 814 may be connected to the computing environment to support the implementation by facilitating data communication within computing environment 802 as well as between computing environment 802 and external devices and entities.

The example embodiments disclosed herein may be implemented through at least one software program running on at least one hardware device and performing network management functions to control the elements. The elements shown in the FIGS. 1a through 8 include blocks which may be at least one of a hardware device, a software module, or a combination of hardware device and software module.

The foregoing description of the example embodiments will so fully reveal the general nature of the example embodiments herein that others can, by applying current knowledge, readily modify or adapt for various applications such example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, those skilled in the art will recognize that the example embodiments herein can be practiced with modification within the spirit and scope of the example embodiments as described herein.

What is claimed is:

1. A method for managing data communication at a Dual SIM Dual Standby (DSDS) device having a first Subscriber Identity Module (SIM) and a second SIM, the method comprising:
   performing data communication with a network entity via a Radio Resource Control (RRC) connection over a first SIM;
   detecting an activity upcoming over a second SIM; and
   transmitting a connection suspend indication on a selected channel to the network entity to suspend the data communication over the first SIM, the selected channel being one of a Layer-1 control signaling channel, a Layer-2 control signaling channel, or a Layer-3 control signaling channel, the selected channel being selected based on a type of the activity upcoming over the second SIM.

2. The method of claim 1, further comprising:
   receiving a connection suspend acknowledgement indication from the network entity; and
   tuning a Radio Frequency (RF) resource from the first SIM to the second SIM.

3. The method of claim 1, wherein the Layer-1 control signaling channel is one of a Physical Uplink Control Channel (PUCCH) or a Physical Uplink Shared Channel (PUSCH).

4. The method of claim 3, further comprising:
   transmitting the connection suspend indication as piggy back information when a PUSCH grant is available, and
   transmitting the connection suspend indication on the PUCCH when the PUSCH grant is unavailable.

5. The method of claim 1, wherein the selected channel is the Layer-1 control signaling channel when the type of the activity is at least one of time critical, periodic, or short in duration.

6. The method of claim 1, wherein the selected channel is the Layer-2 control signaling channel when the type of the activity is at least one of not time critical, not periodic, long in duration, correlated with a protection level, or an impact of communication failure of the activity is within a threshold.

7. The method of claim 1, wherein the selected channel is the Layer-3 control signaling channel when the type of the activity is at least one of reception of a paging message, not time critical, or includes transfer of large information elements.

8. The method of claim 1, wherein the connection suspend indication includes a data suspension reason, a data suspension period, and an error probability.

9. A Dual SIM Dual Standby device, comprising:
   a first Subscriber Identity Module (SIM);
   a second SIM; and
   a controller, wherein the controller is configured to
     perform data communication with a network entity via a Radio Resource Control (RRC) connection over the first SIM,
     detect an activity upcoming over the second SIM, and
     transmit a connection suspend indication on a selected channel to the network entity to suspend the data communication over the first SIM, the selected channel being one of a Layer-1 control signaling channel, a Layer-2 control signaling channel, or a Layer-3 control signaling channel, the selected channel being selected based on a type of the activity upcoming over the second SIM.

10. The Dual SIM Dual Standby device of claim 9, wherein the controller is further configured to:
    receive a connection suspend acknowledgement indication from the network entity; and
    tune a Radio Frequency (RF) resource from the first SIM to the second SIM.

11. The Dual SIM Dual Standby device of claim 9, wherein the Layer-1 control signaling channel is one of a Physical Uplink Control Channel (PUCCH) or a Physical Uplink Shared Channel (PUSCH).

12. The Dual SIM Dual Standby device of claim 11, wherein the controller is further configured to:
    transmit the connection suspend indication as piggy back information when a PUSCH grant is available, and
    transmit the connection suspend indication on the PUCCH when the PUSCH grant is unavailable.

13. The Dual SIM Dual Standby device of claim 9, wherein the selected channel is the Layer-1 control signaling channel when the type of the activity is at least one of time critical, periodic, or short in duration.

14. A device, comprising:
    a first Subscriber Identity Module (SIM);
    a second SIM; and
    a controller, wherein the controller is configured to
      perform data communication with a network entity via a Radio Resource Control (RRC) connection over the first SIM,
      detect an upcoming activity at the second SIM,
      determine one or more channel selection parameters,
      select a selected channel from among a Layer-1 control signaling channel, a Layer-2 control signaling channel, or a Layer-3 control signaling channel based on the one or more channel selection parameters corresponding to a type of the upcoming activity at the second SIM,
      transmit a connection suspend indication to the network entity over the selected channel in response to detecting the upcoming activity, and
      tune an RF resource from the first SIM to the second SIM after detecting the upcoming activity.

15. The device of claim 14, wherein the type of the upcoming activity includes one or more of reception of a System Information Block (SIB), reception of a paging message, a measurement operation, or a location area update.

16. The device of claim 14, wherein the one or more channel selection parameters include one or more of
a time criticality of the upcoming activity,
a periodicity of the upcoming activity,
a duration of the upcoming activity,
whether a bit indication is to be sent in the connection suspend indication with low latency,
whether the upcoming activity is associated with a protection level,
whether an impact of communication failure is within a set threshold,
whether average latency is expected,
whether the second SIM is in a static condition, wherein only paging reception is scheduled, or the upcoming activity includes transferring large information elements,
whether the upcoming activity includes transferring large information elements in one of the connection suspend indication or a resume indication,
whether the upcoming activity includes delay constraints, or
whether the resume indication is expected with large information elements.

17. The device of claim 16, wherein the Layer-1 control signaling channel is selected as the selected channel in response to determining the one or more channel selection parameters indicate the type of the upcoming activity is one or more of time critical, periodic, or short in duration.

18. The device of claim 16, wherein the Layer-2 control signaling channel is selected as the selected channel in response to determining the one or more channel selection parameters indicate the type of the upcoming activity is one or more of not time critical, not periodic, long in duration, correlated with a protection level, or the impact of communication failure during the upcoming activity is within the set threshold.

19. The device of claim 16, wherein the Layer-3 control signaling channel is selected as the selected channel in response to determining the one or more channel selection parameters indicate the type of the upcoming activity is at least one of reception of a paging message, not time critical, or includes transfer of large information elements.

20. The device of claim 14, wherein the controller is further configured to:
detect that the upcoming activity is completed at the second SIM after tuning the RF resource from the first SIM to the second SIM;
tune the RF resource from the second SIM to the first SIM in response to detecting that the upcoming activity is completed at the second SIM;
transmit a request to the network entity to resume communication over the first SIM; and
resume data communication with the network entity over the first SIM after transmitting the request to the network entity.

* * * * *